United States Patent [19]

Linam et al.

[11] 3,849,626

[45] Nov. 19, 1974

[54] APPARATUS FOR CONTROLLING THE WELDING PATTERN BETWEEN WELDMENT COMPONENTS

[75] Inventors: Richard Lee Linam, Leaque City; Hilary W. Sheehan, Pasadena, both of Tex.

[73] Assignee: Kelso Marine, Inc., Galveston, Tex.

[22] Filed: May 22, 1973

[21] Appl. No.: 362,780

[52] U.S. Cl. ............................................ 219/124
[51] Int. Cl. ............................................ B23k 9/12
[58] Field of Search .......... 219/124, 125 R, 125 PL, 219/101–102, 104, 107; 228/44

[56] References Cited
UNITED STATES PATENTS

| | | | |
|---|---|---|---|
| 3,119,009 | 1/1964 | Zeller............................ | 219/125 R |
| 3,154,665 | 10/1964 | Dunning et al. .................. | 219/124 |
| 3,634,648 | 1/1972 | Morris et al. .................... | 219/125 R |

*Primary Examiner*—C. L. Albritton
*Attorney, Agent, or Firm*—Jack W. Hayden

[57] ABSTRACT

The present invention relates to an apparatus for controlling the welding pattern between weldment components. Means are provided for supporting and moving weldment components horizontally relative to one or more welding guns. Disc means are mechanically linked to the moving means for the weldment components and the disc means are provided with a plurality of circumferentially spaced openings for receiving projections therein, so that when the weldment components are moved, the disc means rotate and the projection means thereon engage switches to turn welding guns off and welding guns on depending upon the position of the projection means in the disc means.

Additional means are provided for positioning and maintaining the disc means in a predetermined relationship so that the weld pattern may be varied and controlled as desired.

4 Claims, 5 Drawing Figures

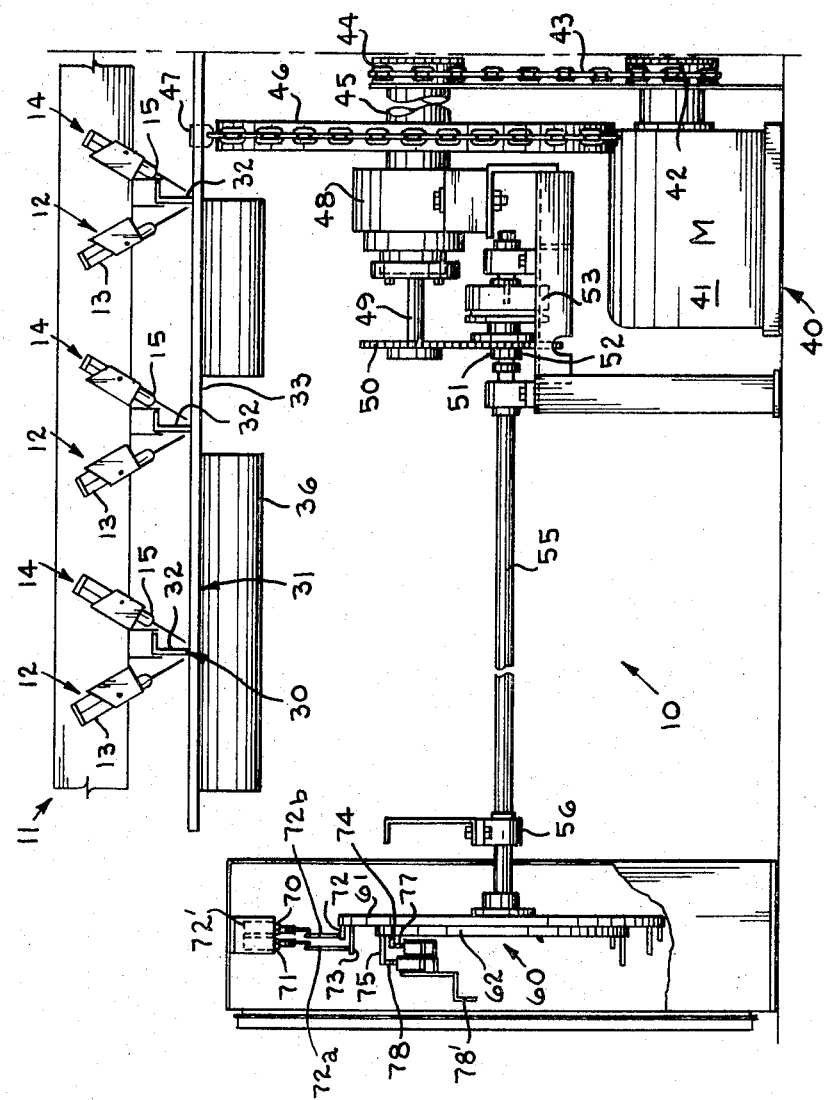
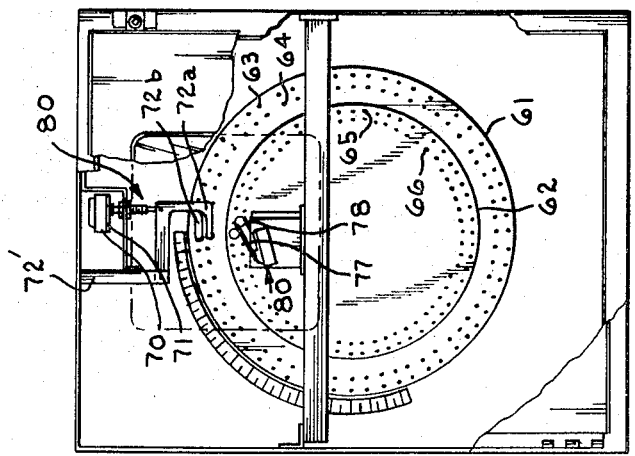

APPARATUS FOR CONTROLLING THE WELDING PATTERN BETWEEN WELDMENT COMPONENTS

CROSS REFERENCE TO RELATED APPLICATION

The present invention may be used in connection with copending application Ser. No. 362,779, filed on May 22, 1973, for "welding crater fill mechanism."

SUMMARY OF THE INVENTION

Applicant is not familiar with any prior art as such, and the present invention relates to a relative simple arrangement for controlling welding guns to automatically turn them on and off at predetermined intervals as desired so that the welding guns may weld between weldment components at predetermined intervals therealong, that are moving horizontally relative to the welding guns.

Still another object of the present invention is to provide a welding pattern control apparatus so that when a pair of rows of welding guns are employed to weld between weldment components moving horizontally relative to the pair of rows of welding guns, the welding guns may be cycled so that the weld between the weldment components may be aligned relative to each other, or they may be offset or arranged in any other desired pattern.

In addition, the present invention by its arrangement actuates the welding guns of one row of a pair of rows of welding guns to turn them on for a predetermined interval and then to cut them off and then to turn on the second row of welding guns for welding of weldment components moving relative to the pair of rows of welding guns and then turn off the second row of welding guns.

Yet a further object of the present invention is to correlate the horizontal movement of the weldment components to the means for actuating the welding guns so that the cycle period of the welding guns is related to the distance of movement of the weldment components even if the speed of movement varies, or if movement of the weldment components is completely stopped and then restarted.

Other objects and advantages of the present invention will become apparent from consideration of following description and drawings.

BRIEF DESCRIPTION OF THE DRAWINGS

FIG. 1 is an elevation view illustrating a preferred form of the disc means for controlling the electrical signals to turn the welding guns on and welding guns off in a pair of rows of welding guns;

FIG. 2 is an end view partly in section diagramatically illustrating a pair of rows of welding guns, one row being termed the front row and the other row being termed the second or rear row of welding guns such as shown and described in U.S. Pat. No. 3,650,457. Schematically illustrated are support means for holding vertical weldment components or members that are to be welded to a horizontal weldment component as well as means for simultaneously moving the weldment components relative to the rows of welding guns and means for mechanically connecting the controls of FIG. 1 to the moving means to correlate the cycle of operation of the rows of welding guns with the horizontal movement of the weldment components relative to the rows of welding guns;

DESCRIPTION OF THE PREFERRED EMBODIMENT

Figure 5:
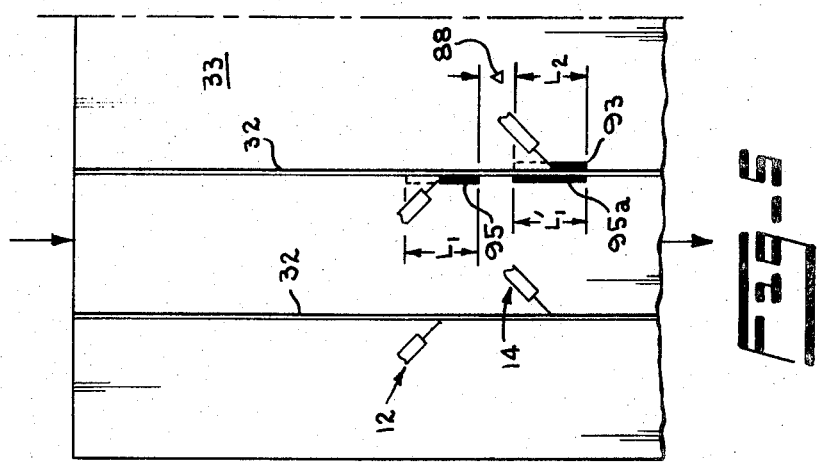
FIG. 5 is a partial diagrammatic view illustrating weldment components and diagramatically illustrating the operation of the present invention.

Attention is first directed to FIG. 2 of the drawings wherein the invention is referred to generally by the numeral 10. A first row 12 of welding guns 13 is diagramatically illustrated as is a second row 14 of welding guns 15. This general structural arrangement of the welding guns is illustrated in U.S. Pat. No. 3,650,457.

Weldment components 30 and 31 comprising the spaced vertical members 32 and horizontal member 33 are to be moved simultaneously relative to the first and second row of welding guns 12 and 14 for welding the vertical stiffners 32 to the horizontal member 33. Suitable support means as schematically referred to at 11 are provided for retaining the vertical members 32 in a desired relationship relative to the horizontal weldment component 33 as the weld therebetween is effected as will be described hereinafter.

Suitable means as referred to at 40 are provided for moving the weldment components horizontally relative to the rows of welding guns and comprise the motor 41 connected by the sprocket 42 on the shaft thereof and chain 43 to the sprocket 44 which in turn rotates shaft 45 upon which longitudinally aligned and spaced sprockets 46 are mounted. The spaced sprockets 46 (only one of which is seen) include endless chain means thereon having retractable dogs or lugs 47 for engaging the end of the horizontal weldment 33 to propel it horizontally and relative to the first row 12 and second row 14 of welding guns. If desired suitable support means such as rollers 36 or the like may be provided for accommodating movement or conveying the weldment components through the apparatus.

The shaft 45 is supported by bearing means 48 and the shaft 49 is integrally connected with the shaft 45 and is provided with a gear or sprocket 50 thereon. The sprocket 50 engages the gear or sprocket 51 carried on the shaft 52 and the shaft 52 is also provided with a clutch 53 for selectively disengaging the shaft 52 and sprocket 51 from the shaft 55. The shaft 55 is supported by any suitable means as shown at 56 and the control means for the welding guns is referred to generally at 60 and carried on the end of the shaft 55 as shown in FIG. 2 of the drawings.

The control means 60 comprise disc means in the form of a pair of discs 61 and 62 of unequal diameter. The discs 61 and 62 are provided with a plurality of circumferentially spaced threaded openings 63, 64, 65, and 66 respectively. It will be noted that the row of threaded openings 63 is adjacent to the outer circumferential edge of the disc 61 while the row of openings 64 is spaced inwardly therefrom; similarly, the row of circumferentially spaced openings 65 is adjacent the outer edge of the disc 62 while the row of circumferentially spaced openings 66 is inwardly spaced therefrom.

The distance between each threaded opening 63 is equivalent to 1 inch of horizontal travel of the weldment components 32 and 33, and the angular distance between the holes 64 is the same; likewise, the angular distance between the holes 65 as well as the angular distance between each of the holes 66 is equivalent to 1 inch of horizontal travel of the weldment components 32 and 33. Discs 61 and 62 should be provided with equal numbers of holes 63, 64, 65 and 66. The number of holes should be evenly divisable by various numbers. Each disc 61 and 62 is shown as having 60 holes which can be divided by 6, 10, 12, 15, 20, etc. This, of course, means that the angular distance between the holes will be the same; however the foregoing is merely by way of explanation and illustration.

Figure 3:
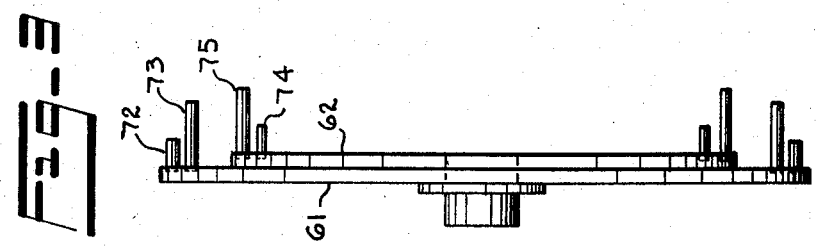
FIG. 3 is an end view of the disc control means of FIG. 1 illustrating a pair of disc means with projection means extending therefrom.

A pair of snap-action switches 70 and 71 are carried by suitable support means 72' for engagement with projection means 72 and 73 carried by the disc 61 as better viewed in FIGS. 2 and 3.

Similarly projection means 74 and 75 carried by disc 62 are provided for engaging snapaction switches 77 and 78 supported in any suitable manner as represented at 78'.

The snap-action switches 70, 71, 77 and 78 control the rows of welding guns 12 and 14 to cycle them on and to turn them off. Such snap-action switches are connected by suitable electrical means referred to generally at 80 and by electrical conduits to the welding controls which initiate the welding arc at the guns 13 and 15 in each row and turn them off respectively. As previously mentioned the holes 63 are spaced from each other so as to be equivalent to 1 inch of horizontal travel of the weldment components as are the holes 64 and the holes 65 and 66 in the disc 62. Suitable scale means 85 are provided to aid in positioning the projection means within the openings 63, 64, 65 and 66 in a desired manner to obtain a desired cycle of operation of the welding guns.

It should be also noted that the disc 62 is rotatably mounted on the shaft 55 so that it may be rotated relative to the disc 61 for purposes as will be described hereinafter. Suitable clamp means 86 are provided for maintaining the disc 62 in a predetermined relationship to the disc 61.

Figure 4:
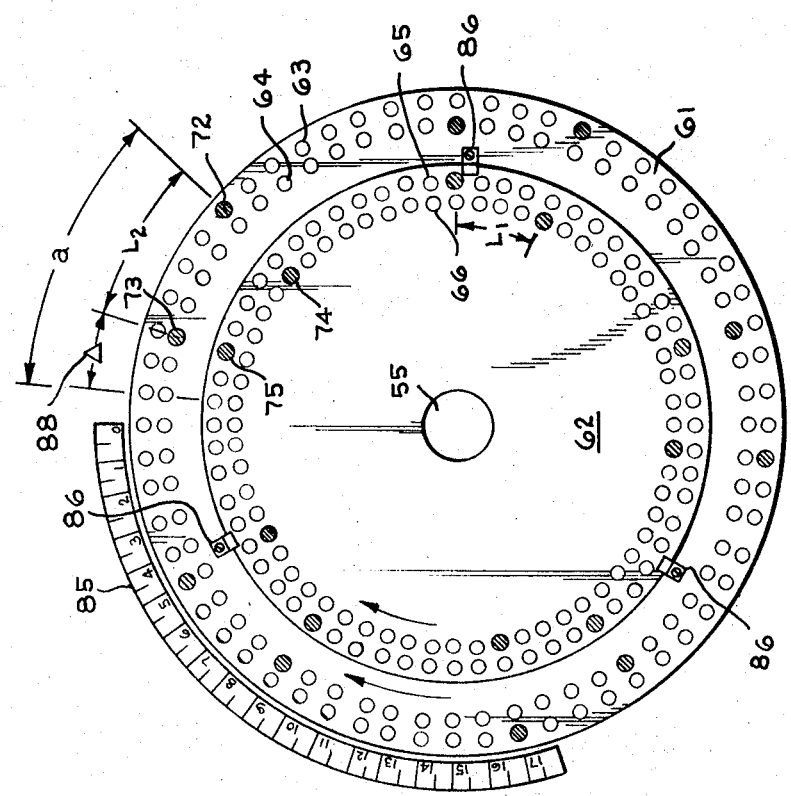
FIG. 4 is a partial elevation view partly in section showing further details of the disc control means.

By way of example only, let it be assumed that it is desired to provide 4 inch welds between the weldment components 32 and 33 on opposite sides of the vertical stiffners 32, with the welds to be spaced 2 inches apart as represented by Delta at 88 in FIG. 5. Therefore, the projection means represented in section at 72 in FIG. 4 will be positioned as shown with the disc 61 rotated so that the projection means 72 is adjacent numeral 0 on the scale 85. The support means 72' includes a pair of depending projections 72a and 72b pivotally mounted on support 72' and when 72b strikes the projection means 72, this actuates the snap-action switch 70 which initiates the welding arcs in the row of guns 14, and the pin 73 will be spaced over from pin 72 the equivalent of 4 inch of travel of the weldment components as shown in FIG. 4 of the drawings so that when the pin 73 engages projection 72a, it actuates snap-action switch 71 and the row of welding guns 14 will be shut off. This distance is represented at $L_2$ in FIGS. 4 & 5.

In the present example, the distance between the rows of welding guns 12 and 14 is 6 inches which is the same as the distance between the beginning of weld 93 and the beginning of weld 95 which is located on the opposite side of the vertical weldment component 32. This will leave a distance of 2 inches between the end of weld 93 and the weld 95, which distance is represented at 88 in FIG. 5. Because of this arrangement, the welding guns 13 in row 12 and the welding guns 15 in row 14 must all start welding at the same time. This will place weld 95 6 inches behind weld 93. To cause welding guns 12 to arc at the same time welding guns 14 arc, projection means 74 will be placed in line, radially, with projection means 72. Projection means 74 actuates snap-action switch 77 which causes welding guns 13 to arc. Similarly, projection means 75 must be placed radially aligned with projection means 73. Projection means 75 will actuate switch 78 to cause the row of welding guns 12 to stop welding when the weldment components have moved 4 inches relative to the welding guns 13. This distance is represented at $L_1$ in FIGS. 4 & 5.

As noted the welds 93 and 95 are offset by the distance represented at 88 which in the example given is 2 inches; however, it can be appreciated that the pins 72 and 73 can be at any spaced interval to obtain any desired length of weld 93 and similarly the pins 74 and 75 can be positioned on disc 62 to obtain any desired length of weld 95, and the distance 88 between welds 93 and 95 can be varied as desired as long as the number of projection means 72, 73, 74 or 75 will divide evenly into the number of holes 63, 64, 65 or 66 respectively.

After the pins 72, 73, 74, and 75 have been positioned in the disc means 61 and 62, it may become desirable for some reason to change the pattern of the weld so that the welds 93 and 95 instead of being offset as illustrated in FIG. 5 are opposite each other or aligned as shown at 93 and 95a in FIG. 5. Should this become desirable, then the disc 62 may be rotated relative to the disc 61 by loosening the clamps 86 and rotating the disc 62 so that the pin 74 is located six angular increments counterclockwise from pin 72, as represented by the letter a in FIG. 4. Similarly pin 75 will be located six angular increments counterclockwise from pin 73, but will maintain its four increment spacing from pin 74. It is understood, of course, that the distance between each of the openings 63, the distance between each of the openings 64, the distance between each of the openings 65 and the distance between each of the openings 66 represents an increment. This would start the arcs of the welding guns in rows 12 and 14 and turn them off in a manner to obtain the pattern of welds represented at 93 and 95a in FIG. 5.

Should it be desired to provide the crater fill mechanism of copending application Ser. No. 362,779, then the disc means 61 and 62 would function as the welding control means referred to in such application.

The foregoing disclosure and description of the invention are illustrative and explanatory thereof, and various changes in the size, shape, and materials as well as in the details of the illustrated construction may be made without departing from the spirit of the invention.

What is claimed is:

1. An arrangement for actuating welding guns to weld weldment components moving relative to the welding guns comprising:
   a. means for supporting the weldment components;
   b. means for moving the weldment components horizontally relative to the welding guns;
   c. switch means for turning the welding guns on to weld between the weldment components and for turning the welding guns off when the weld is completed; and
   d. means rotatable by said moving means for engaging said switch means to first turn the welding guns on and to then turn the welding guns off after a predetermined amount of travel of the weldment components.

2. The invention of claim 1 wherein said rotatable means includes:
   a. shaft means connected to be rotated by said moving means;
   b. disc means on said shaft means and rotatable therewith;
   c. projection means carried by said disc means and engagable with said switch means for actuation thereof to turn the welding guns on and to shut them off.

3. The invention of claim 2 wherein said projection means are removably positioned in said disc means so that any predetermined desired pattern of said projection means on said disc means may be effected to cycle the actuation and de-actuation of the welding guns in a predetermined manner.

4. The invention of claim 3 wherein said disc means comprise a pair of discs of unequal diameter, and means to position said pair of discs in a predetermined relative rotated position to predetermine the weld pattern between the weldment components.

* * * * *